Aug. 5, 1958                H. W. FLANAGAN                2,846,156
                        UNIVERSAL COIL WINDING MACHINE
Filed April 1, 1954                                3 Sheets-Sheet 1
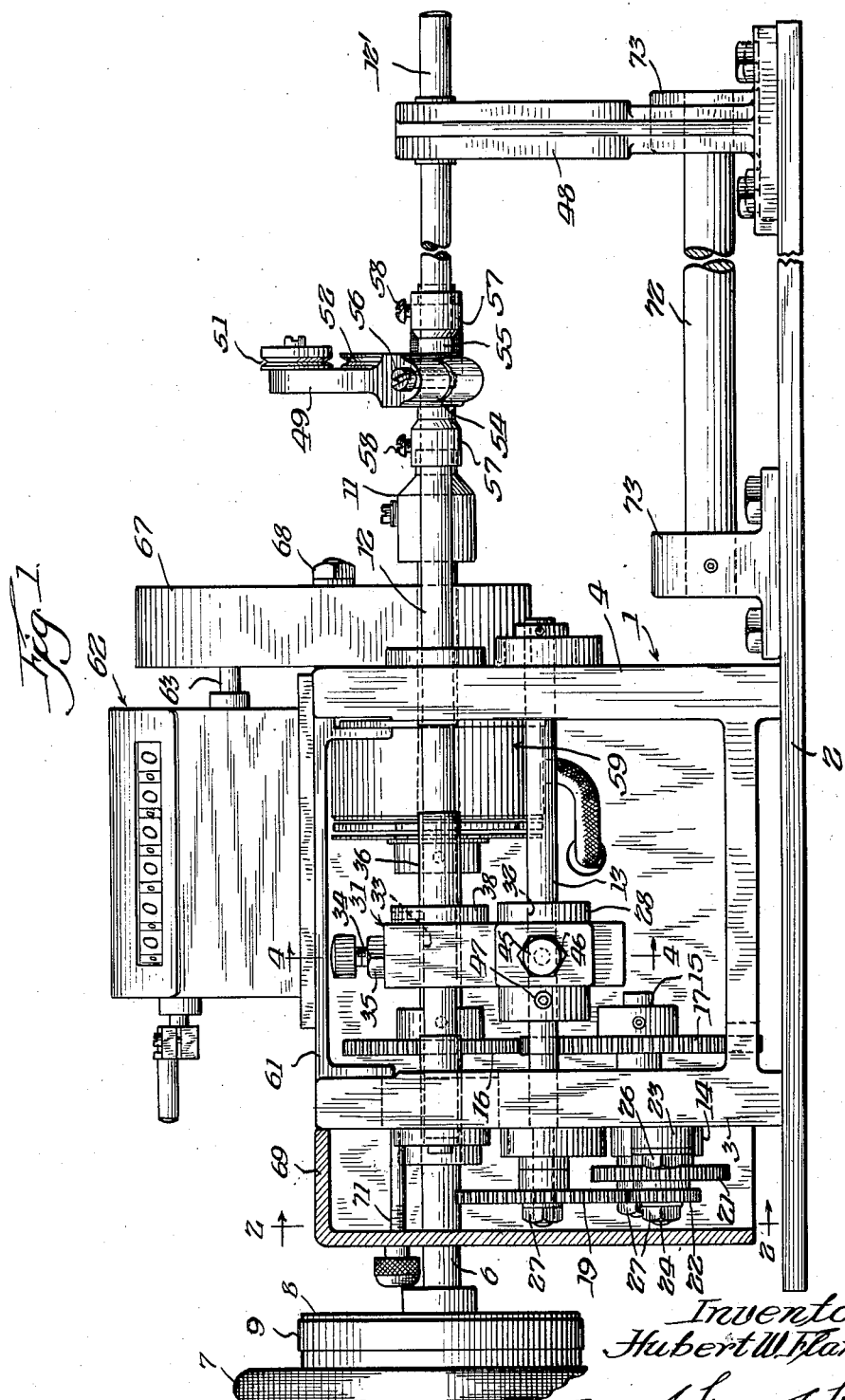

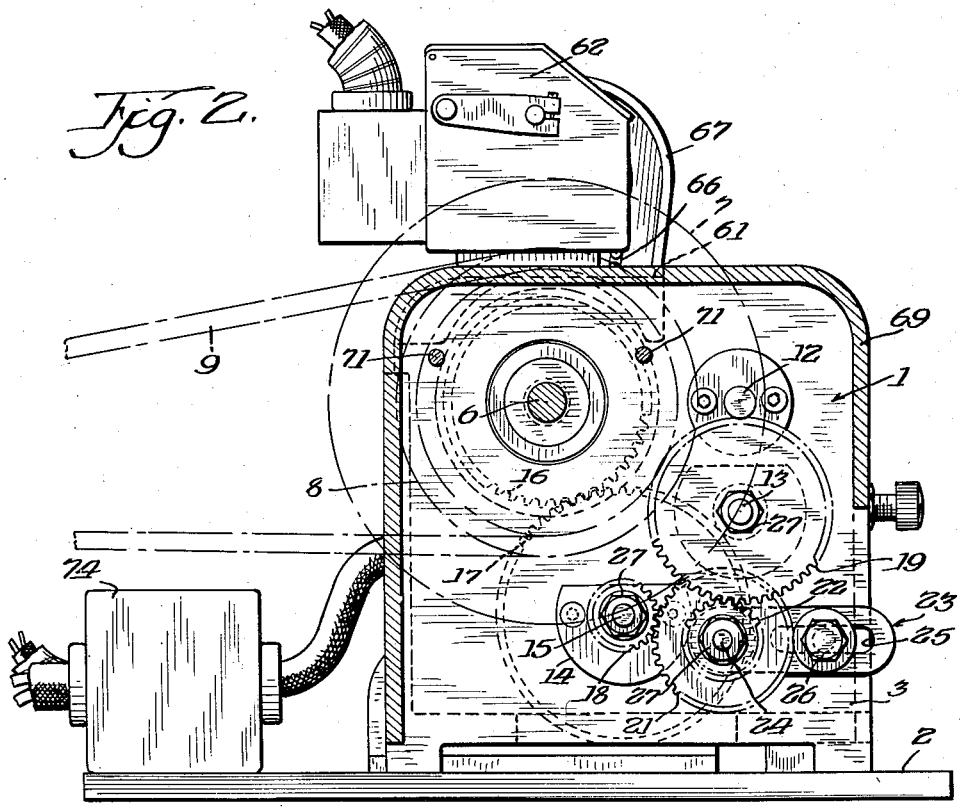
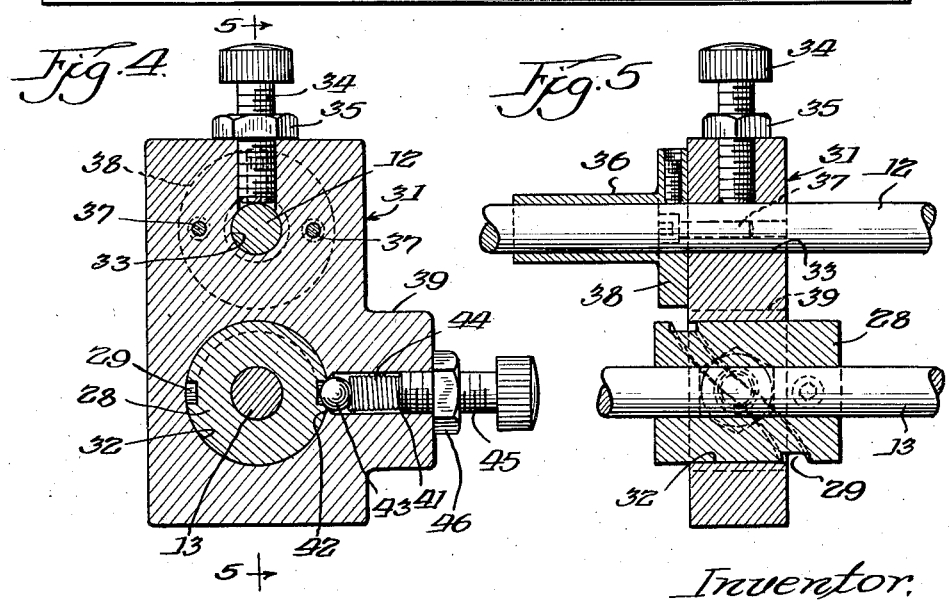

Aug. 5, 1958 H. W. FLANAGAN 2,846,156
UNIVERSAL COIL WINDING MACHINE
Filed April 1, 1954 3 Sheets-Sheet 3
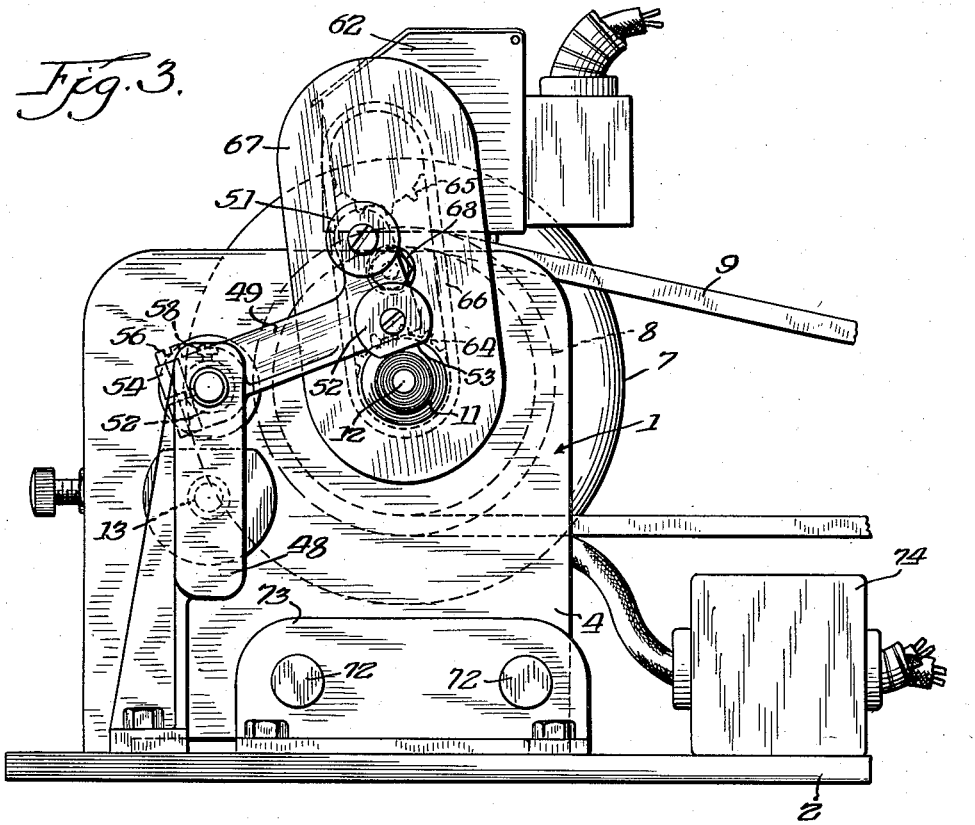
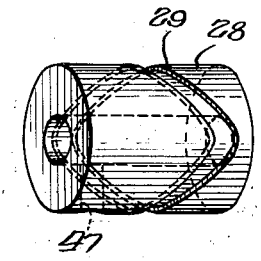
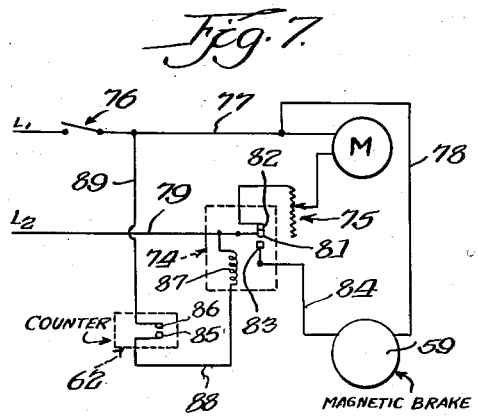
Inventor:
Hubert W. Flanagan.
By Hee & Hee
Attys.

United States Patent Office 2,846,156
Patented Aug. 5, 1958

2,846,156

UNIVERSAL COIL WINDING MACHINE

Hubert W. Flanagan, Chicago, Ill.

Application April 1, 1954, Serial No. 420,381

4 Claims. (Cl. 242—9)

The invention relates generally to winding machines, and more particularly to a machine for winding lattice around coils and the like.

The invention has among its objects the production of a coil winding machine which is relatively simple in construction, inexpensive to manufacture and very efficient for the purposes intended.

Another object of the invention is the production of such a coil winding machine which is provided with novel means for reciprocating the wire or conductor guiding member relative to the coil, whereby all loose play is eliminated and the guiding member is reciprocated smoothly and evenly, the construction being such that the machine may be readily adjusted for different lengths of travel of the guiding member.

A further object of the invention is the production of such a coil winding machine which is so designed that the coils may be accurately wound with the desired number of turns thereon, provision being made for disconnecting the power source and quickly and efficiently stopping the machine when the coil has been completed.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevational view of a coil winding machine embodying the present invention;

Fig. 2 is a sectional view taken approximately on the line 2—2 of Fig. 1;

Fig. 3 is an elevational view of the opposite end of the machine;

Fig. 4 is a sectional view taken approximately on the line 4—4 of Fig. 1 of the reciprocating mechanism or carriage;

Fig. 5 is a sectional view taken approximately on the line 5—5 of Fig. 4;

Fig. 6 is an isometric view of the cam illustrated in Figs. 4 and 5; and

Fig. 7 is a diagrammatic figure of the general electrical circuit which may be employed with the machine.

The present invention contemplates the utilization of a cylindrical cam having a continuous circumferential groove therein adapted to cooperate with means associated with the wire guiding member to reciprocate the latter as the coil winding operation is performed. The cam and associated carriage structure connected to the guide member is so designed that backlash and lost motion is eliminated, whereby the winding operation is smoothly and efficiently performed. The invention also contemplates the use of a counting mechanism in conjunction with suitable braking means, whereby upon the completion of the required turns on the coil, the power is disconnected from the machine and the coil supporting mandrel brought to an immediate stop, this operation being automatic and eliminating equivalent manual operation. Consequently increased production may be obtained as it is unnecessary for the operator to operate the machine at very slow speeds in order to be sure the latter is stopped at the proper time.

Referring to the drawings and more particularly to Figs. 1 to 3, the reference numeral 1 indicates generally a U-shaped base structure which in the embodiment of the invention is illustrated as being supported by a base plate 2, the base structure 1 having a pair of upwardly extending generally rectangularly shaped side walls 3 and 4 extending in parallel relation. Carried by side walls 3 and 4 in suitable bearing members is a mandrel 6, the ends of which extend outwardly beyond the respective walls 3 and 4, with the end adjacent the wall 3 having a hand wheel 7 and drive pulley 8 mounted thereon. The mandrel 6 is adapted to be rotated by a suitable source of power, as for example, an electric motor which is connected to the pulley 8 by a suitable belt 9. Operatively carried by the opposite end of the mandrel shaft 6 is a suitable coil form supporting means indicated generally by the numeral 11, which may be of any suitable type to accommodate the desired coil forms, and the specific details of which form no part of the present invention.

Slidably supported by the walls 3 and 4 for reciprocation relative thereto is a guide shaft or rod 12 which is carried in suitable bearings and extends parallel to the mandrel shaft 6. Extending between the walls 3 and 4 and rotatably supported in suitable bearings is a shaft 13, the latter also extending parallel to the mandrel shaft 6 and rod 12. Carried by wall 3 and journaled in a suitable bearing 14 is a countershaft 15, the latter being operatively connected to the mandrel shaft 6 through a gear 16 carried by the mandrel shaft 6 and a gear 17 carried by the countershaft 15, a pinion 18 being mounted on the opposite or outer end thereof. The countershaft 15 is operatively connected to the shaft 13 through a gear train illustrated in the present instance as comprising the pinion 18, gears 19, 21, and 22, the gear 21 being rigidly connected to the gear 22.

The gears 21 and 22 are operatively carried on a suitable idler bracket indicated generally by the numeral 23 which is adjustably mounted on the side wall 3. In the embodiment of the invention illustrated, the bracket 23 is provided with a rigid stop shaft 24 on which the gears 21 and 22 are rotatably supported, the bracket being provided with a slot 25 therein through which extends an attaching bolt 26 threaded into the wall 3. Referring to Fig. 2, it will be noted that the pinion 18, gear 19 and gears 21 and 22 are maintained in operative position by nuts 27 threaded on the shafts, with the pinion 18 and gear 19 being suitably keyed to their corresponding shafts. Thus, as the mandrel shaft 6 is rotated, the shaft 13 will be rotated at a suitable reduced speed through the reduction gearing above described. As the gears 18, 19, 21, and 22 are detachably mounted on their respective shafts, they may be readily removed and other gear combinations substituted therefor, the bracket 23 being suitably adjusted to accommodate the particular gear train employed.

Mounted on the shaft 13 is a cylindrical cam 28 having a continuous circumferential groove 29 therein and mounted on the rod 12 is a carriage indicated generally by the numeral 31 having a bore 32 therein in which is positioned the cam 28. The carriage 31 is also provided with a bore 33 therein extending parallel to the bore 32 through which the rod 12 extends, the latter being locked in rigid relation with respect to the carriage 31 by a screw 34 and lock nut 35. In the embodiment of the invention illustrated, a sleeve 36 is secured to the carriage 31 by screws 37 extending through the flange 38 of the sleeve 36, the screws 37 being suitably threaded into the carriage 31, whereby additional rigidity is imparted to the structure and when desired the carriage may be moved along the rod 12 without any tendency to cock or bind thereon. The carriage 31 is also provided with a boss or projection 39 which is provided with a bore 41 which, in the embodiment of the invention illustrated, extends substantially diametrically with respect to the cylindrical cam 28, the bore 41 being provided with an internally extending annular flange 42 adjacent its intersection with the bore 32. Positioned in the bore 41 and engageable with the side walls of the cam groove 29 is a sphere or ball 43 which is maintained in such relation by a compression spring 44, one end of which bears against the ball 43 and the opposite end against an adjusting screw 45 threaded into the bore 41. Thus by rotating the screw 45 in the bore 41 the compression of the spring 44 may be varied to provide the desired amount of force on the ball 43, with the screw 45 being locked in any of its adjustable positions by a suitable lock nut 46. In this construction, the carriage 31 is effectively connected to the cam 28 with substantially all backlash and lost motion eliminated between the two elements, so that as the cam 28 is rotated the carriage 31 will reciprocate along the cam.

It will be apparent that the particular shape of the groove 29 will determine the length of travel of the reciprocable rod 12, so that by varying the shape of the slot 29, the length of travel of the carriage 31 and the rod 12 may likewise be varied. The cam 28 may be replaced with any other desired cam by removing the gear 19 from the shaft 13 and loosening the set screw 47 which locks the cam 28 to the shaft 13, following which the shaft 13 may be moved axially through the side wall 4 until the cam 28 may be removed from the adjacent end of the shaft. The new cam is then placed on the shaft and the structure reassembled. To facilitate such replacement the carriage 31 may be unlocked from the rod 12 and moved axially therealong to permit the cam 28 to be removed and the new cam inserted therein.

A suitable standard 48 may be provided to support the free end 12' of the rod 12 and carried by the latter is a conductor guiding member 49, the latter having a rotatable guide wheel 51 and a fixed guide disk 52 over which the wire may pass, the disk 52 being flattened as indicated at 53 and adapted to bear on the coil supported on the member 11. The member 42 is provided with a clamp ring portion 54 in which is positioned a sleeve 55, the member 49 being clamped to the sleeve 55 by the bolt 56. Axial movement of the sleeve 55 is prevented by a pair of collars 57 locked to the rod 12 by screws 58, whereby the member 49 is maintained in fixed relation with respect to the rod 12 as the latter is axially reciprocated, but is free to rotate with the sleeve 55 about the axis of the rod 12 and thus follow the coil being wound as the diameter of the latter increases.

Mounted on the side wall 4 is an electrical or magnetic braking structure indicated generally by the numeral 59, the latter being operatively connected to the mandrel shaft 6. The braking structure 59 may be of a type readily procurable on the open market and the details thereof form no part of the present invention. However, briefly such devices generally include a rotatable member which is rigidly attached to and rotatable with the shaft 6 in combination with suitable braking elements frictionally engageable with the rotatable member to stop rotation of the latter and thus the shaft 6 when desired, the braking elements being suitably actuated by magnetic means upon the application of electrical energy to the device.

Mounted on a cross member 61, suitably connected to and supported by the side walls 3 and 4, is a counter mechanism indicated generally by the numeral 62, the latter also being of common type commercially procurable, and having an actuating shaft 63 extending therefrom. In the embodiment of the invention illustrated, the counter mechanism 62 is operatively connected to the mandrel shaft 6 by a pair of sprockets 64 and 65, respectively, carried by the shafts 6 and 63 and a chain 66, the sprockets and chain being enclosed by a suitable protective cover 67 secured to the side wall 4 by a bolt 68. In like manner, the gear train comprising the gears 18, 19, 21 and 22 may likewise be enclosed by a suitable cover 69 which is secured to the side wall 3 by a pair of removable screws 71.

Suitable cylindrical guide ways 72 carried by a pair of standards 73 may also be provided for supporting special jigs and fixtures for use in special coil winding operations, etc.

The basic electrical circuit employed is illustrated in Fig. 7 wherein the power line L1—L2 may be operatively connected to the drive motor M and magnetic brake structure 59 through a suitable relay 74, counter 62 and rheostat 75 in the following manner: The line L1 is connected through a suitable on and off switch 76 by a conductor 77 to one terminal of the motor M and by conductor 78 to one terminal of the magnetic brake 59. The opposite side L2 of the power line is connected by a conductor 79 to a movable contact 81 of the relay 74, the latter having a pair of stationary contacts 82 and 83, with the contact 82 being operatively connected through the rheostat 75 to the other terminal of the motor M. The contact 83 of the relay 74 is operatively connected by a conductor 84 to the other terminal of the brake 59. The counter mechanism 62 may be provided with a pair of normally open contacts 85 and 86 adapted to be closed when the counting mechanism reaches a predetermined desired total, at which point the contacts 85 and 86 are closed. The relay 74 is provided with an actuating winding 87, one side of which is connected to the side L2 of the power line, the opposite side being operatively connected to the other side L1 of the power line through the switch contacts 85 and 86, such side of the relay being connected by conductors 88 to the contact 85 and the contact 86, in turn being connected to the side L1 by the conductor 89. The relay 74 is so designed that the contacts 81 and 82 are normally closed and the contacts 81 and 83 normally open when the relay is deenergized, but upon the closing of the contacts 85 and 86, the winding 87 is energized, thereby actuating the movable contact 81 to open the contacts 81—82 and close the contacts 81—83.

The operation of the circuit described is as follows: The operator sets the counter for the desired number of turns desired, it being noted that the counter is operatively connected to the mandrel shaft 6, whereby each revolution of the latter will advance the counter one unit. The operator then starts the winding operation, controlling the same by means of the rheostat 75, which may be foot controlled. By watching the counter 62 it may be readily determined by the operator when the machine is approaching the completion of the coil, so that the operator may, if desired, at that time slow the machine down somewhat by means of the rheostat. As the desired total is reached the switch contacts 85—86 will close, actuating the relay 64 to disengage the motor from the power source and operatively connect the power to the magnetic brake, which upon actuation will stop the rotation of the shaft 6 at the desired point to eliminate any over-run thereof.

It will be apparent that with this construction the machine may be operated at maximum speed until the completion of the coil approaches, the machine preferably being slowed down just prior to such completion to reduce the braking action required and insure the elimination of any tendency to over-run. Obviously, without this braking action it would be necessary for the operator to slow the machine down as the end of the coil approaches to such a point that he may accurately manually stop the machine upon the completion of the coil. Consequently, by use of the present invention the work of the operator is reduced and increased production obtained.

It will be apparent that while I have illustrated a simple electrical circuit for operating the machine, equivalent and additional features may be incorporated therewith, as for example, over-load devices, etc.

It will be apparent from the above description that I have provided a novel coil winding machine which is relatively simple in construction, inexpensive to manufacture and very efficient in use, having comparatively few parts to get out of order or require maintenance. Likewise, it will be noted that I have provided a machine which is extremely flexible in its operation and use, whereby the same may be utilized to handle various types of coils as well as various sizes thereof, this being accomplished with a minimum of adjustment whereby a changeover may be quickly and easily made, reducing non-productive time to a minimum.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a coil winding apparatus, the combination of a rotatable coil form supporting mandrel, a reciprocable conductor guide member positioned adjacent to said mandrel for guiding a conductor as the same is wound around a coil form supported by said mandrel, a reciprocable guide shaft for reciprocably mounting said reciprocable conductor guide member, a rotatable shaft operatively connected to said mandrel and rotatable in predetermined relation with respect to the latter, a cylindrical cam member carried by said rotatable shaft having a continuous circumferentially extending cam groove therein, a carriage provided with a bore for operatively mounting said reciprocable guide shaft and rigidly related to said guide member and also having a bore therein parallel to said bore for said reciprocable guide shaft and of a size to concentrically receive said cam member, said carriage having a bore therein extending diametrically with respect to the cam-receiving bore therein and intersecting the latter, a ball of greater diameter than the width of said cam groove and of slightly less diameter than that of said intersecting bore, positioned in the latter and extending into said cam groove, a coiled compression spring positioned in said intersecting bore with one end of said spring engaging said ball, adjustable means engaging the opposite end of said spring for varying the force exerted by said spring on said ball, said carriage also having a threaded bore angularly related to said intersecting bore and intersecting said bore for the reciprocable guide shaft, and securing means complementally formed to said threaded bore for detachably affixing said carriage to said reciprocable guide shaft.

2. In a coil winding apparatus, the combination of a rotatable coil form supporting mandrel, electrical power means operatively connected to said mandrel for rotation of the latter, a reciprocable conductor guide member positioned adjacent to said mandrel for guiding a conductor as the same is wound around a coil form supported by said mandrel, a reciprocable guide shaft for reciprocably mounting said reciprocable conductor guide member, a rotatable shaft, a cylindrical cam member carried by said rotatable shaft having a continuous circumferentially extending cam groove therein, reduction gearing operatively connecting said mandrel and rotatable shaft, a carriage provided with a bore for operatively mounting said reciprocable guide shaft and rigidly related to said guide member and also having a bore therein parallel to said bore for said guide shaft and of a size to concentrically receive said cam member, said carriage having a bore therein extending diametrically with respect to the cam-receiving bore therein and intersecting the latter, a ball of greater diameter than the width of said cam groove and of slightly less diameter than that of said intersecting bore, positioned in the latter and extending into said cam groove, a coiled compression spring positioned in said intersecting bore with one end of said spring engaging said ball, adjustable means engaging the opposite end of said spring for varying the force exerted by said spring on said ball, said carriage also having a threaded bore angularly related to said intersecting bore and intersecting said bore for the reciprocable guide shaft, securing means complementally formed to said threaded bore for detachably affixing said carriage to said reciprocable guide shaft, an adjustable counting mechanism operatively connected to said rotatable shaft, said counting mechanism including switch means actuatable thereby, magnetically actuated braking means operatively connected to said mandrel for stopping the latter when desired, and means operatively connecting said switch means, said power means is rendered inoperable and said braking means is actuated.

3. In a coil winding apparatus, the combination of a relatively U-shaped base structure, a rotatable mandrel operatively supported by said side walls and extending outwardly therefrom, means adjacent one of the ends of said mandrel for operatively connecting a power source thereto, coil form supporting means carried by the mandrel adjacent the opposite end thereof, a reciprocable rod supported by said side walls in parallel relation with respect to said mandrel, conductor guide means carried by said rod in opposed relation to the coil form supporting means carried by said mandrel, for guiding a conductor as the same is wound around a coil form supported by said mandrel, a rotatable shaft operatively supported by said side walls and extending parallel to said mandrel and rod, a countershaft supported by one of said side walls, gearing operatively connecting said mandrel and countershaft, a gear train operatively connecting said rotatable shaft and said countershaft, said gear train including an adjustable gear supporting bracket by means of which different gear trains may be utilized, a cylindrical cam member carried by said rotatable shaft and having a continuous circumferentially extending cam groove therein, a carriage provided with a bore for operatively mounting said reciprocable rod and rigidly related to said rod and having a bore therein of a size to concentrically receive said cam member, said carriage also having a bore therein parallel to said bore for said reciprocable rod and of a size to concentrically receive said cam member, said carriage having a bore therein extending diametrically with respect to the cam-receiving bore therein and intersecting the latter, a ball of greater diameter than the width of said cam groove and of slightly less diameter than that of said intersecting bore, positioned in the latter and extending into said cam groove, a coiled compression spring positioned in said intersecting bore with one end of said spring engaging said ball, adjustable means engaging the opposite end of said spring for varying the force exerted by said spring on said ball, said carriage also having a threaded bore angularly related to said intersecting bore and intersecting said bore for the reciprocable rod, and securing means complementally formed to said threaded bore for detachably affixing said carriage to said reciprocable rod.

4. In a coil winding apparatus, the combination of a relatively U-shaped base structure, a rotatable mandrel operatively supported by said side walls and extending outwardly therefrom, means adjacent one of the ends of said mandrel for operatively connecting a power source thereto, coil form supporting means carried by the mandrel adjacent the opposite end thereof, a reciprocable rod supported by said side walls in parallel relation with respect to said mandrel, conductor guide means carried by said rod in opposed relation to the coil form supporting means carried by said mandrel, for guiding a conductor as the same is wound around a coil form supported by said mandrel, a rotatable shaft operatively supported by said side walls and extending parallel to said mandrel and rod, a countershaft supported by one of said side walls, gearing operatively connecting said mandrel and countershaft, a gear train operatively connecting said rotatable shaft and said countershaft, said gear train including an adjustble gear supporting bracket by means of which different gear trains may be utilized, a cylindrical cam member carried by said rotatable shaft and having a continuous circumferentially extending cam groove therein, a carriage provided with a bore for operatively mounting said reciprocable rod and rigidly related to said rod and having a bore therein of a size to concentrically receive said cam member, sleeve means affixed to said carriage and adapted for concentrically and slidably mounting on said rod, whereby additional rigidity is imparted to the carriage so that the carriage may be moved along the reciprocable rod without cocking or binding thereon said carriage also having a bore therein parallel to said bore for said reciprocable rod and of a size to concentrically receive said cam member, said carriage having a bore therein extending diametrically with respect to the cam-receiving bore therein and intersecting the latter, a ball of greater diameter than the width of said cam groove and of slightly less diameter than that of said intersecting bore, positioned in the latter and extending into said came groove, a coiled compression spring positioned in said intersecting bore with one end of said spring engaging said ball, said carriage also having a threaded bore angularly related to said intersecting bore and intersecting said bore for the reciprocable rod, securing means complementally formed to said threaded bore for detachably affixing said carriage to said reciprocable rod, and adjustable counting mechanism operatively connected to said rotatable shaft, said counting mechanism including switch means actuatable thereby, magnetically actuated braking means operatively connected to said mandrel for stopping the latter when desired, and means operatively connecting said switch means, said power means and said braking means whereby upon actuation of said switch means, said power means is rendered inoperable and said braking means is actuated.

References Cited in the file of this patent

UNITED STATES PATENTS

| | | |
|---|---|---|
| 1,357,434 | Anderson | Nov. 2, 1920 |
| 1,941,950 | Meehan | Jan. 2, 1934 |
| 1,948,526 | Liles | Feb. 27, 1934 |
| 1,977,697 | Rockwood | Oct. 23, 1934 |
| 2,032,535 | Geist | Mar. 3, 1936 |
| 2,305,085 | Jacob et al. | Dec. 15, 1942 |
| 2,554,971 | Adler | May 29, 1951 |
| 2,569,618 | Rose | Oct. 2, 1951 |

FOREIGN PATENTS

| | | |
|---|---|---|
| 444,439 | Germany | May, 20, 1927 |